US012679020B2

(12) United States Patent
Baert et al.

(10) Patent No.: US 12,679,020 B2
(45) Date of Patent: Jul. 14, 2026

(54) PANEL AND METHOD OF PRODUCING A PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 522 days.

(21) Appl. No.: 18/060,770

(22) Filed: Dec. 1, 2022

(65) Prior Publication Data

US 2023/0087200 A1    Mar. 23, 2023

Related U.S. Application Data

(63) Continuation-in-part of application No. 17/476,123, filed on Sep. 15, 2021, now Pat. No. 11,649,641, and
(Continued)

(51) Int. Cl.
 *B29C 59/04* (2006.01)
 *B29C 33/02* (2006.01)
 (Continued)

(52) U.S. Cl.
 CPC ............ *B29C 59/04* (2013.01); *B29C 33/026* (2013.01); *B29C 59/002* (2013.01); *B29K 2905/12* (2013.01); *B29L 2007/002* (2013.01)

(58) Field of Classification Search
 CPC ..... B29C 59/04; B29C 59/002; B29C 33/026; B29K 2905/12
 (Continued)

(56) References Cited

U.S. PATENT DOCUMENTS 2,944,291 A    7/1960 Prior et al.
3,421,597 A    1/1969 Hans
 (Continued)

FOREIGN PATENT DOCUMENTS

CN      100419019      2/2007
CN      101386516      3/2009
 (Continued)

OTHER PUBLICATIONS

English translation of EP1126064 (Year: 2003).*
 (Continued)

*Primary Examiner* — Christina A Johnson
*Assistant Examiner* — Xue H Liu
(74) *Attorney, Agent, or Firm* — Heslin Rothenberg Farley & Mesiti P.C.

(57) ABSTRACT

The invention relates to a belt roller system for applying a surface structure in a floor panel or wall panel, said system comprising at least one upper endless belt and at least one lower endless belt, wherein each belt is rotatable around at least two pulleys, and at least one drive unit for rotating the upper endless belt and/or the lower endless belt. At least part of the upper endless belt comprises a surface structure and/or at least part of the lower endless belt comprises a surface structure. The upper endless belt and the lower endless belt are positioned substantially parallel to each other such that a panel can be transported between the upper endless belt and the lower endless belt such that the surface structure of the upper endless belt and/or the surface structure of the lower endless belt is transferred into the panel upon transport of the panel between said upper endless belt and said lower endless belt.

9 Claims, 4 Drawing Sheets

Related U.S. Application Data a continuation-in-part of application No. 17/084,795, filed on Oct. 30, 2020, now Pat. No. 11,542,712, which is a continuation-in-part of application No. 16/817,866, filed on Mar. 13, 2020, now Pat. No. 11,149,441.

(51) Int. Cl.
    *B29C 59/00*        (2006.01)
    *B29L 7/00*         (2006.01)

(58) Field of Classification Search
    USPC ........................................................ 425/115
    See application file for complete search history.

(56)                References Cited

U.S. PATENT DOCUMENTS

| | | | |
|---|---|---|---|
| 3,931,428 | A | 1/1976 | Reick |
| 4,278,728 | A | 7/1981 | Honda |
| 4,446,190 | A | 5/1984 | Pernici |
| 5,336,551 | A | 8/1994 | Graiver |
| 5,631,053 | A | 5/1997 | Andersen |
| 5,776,580 | A | 7/1998 | Rasmussen |
| 6,688,061 | B2 | 2/2004 | Garcia |
| 6,761,794 | B2 | 7/2004 | Mott |
| 6,933,043 | B1 | 8/2005 | Son |
| 7,255,907 | B2 | 8/2007 | Feigin et al. |
| 7,399,510 | B2 | 7/2008 | Dupouy |
| 7,918,062 | B2 | 4/2011 | Chen |
| 8,287,991 | B2 | 10/2012 | Donelson |
| 8,419,877 | B2 | 4/2013 | Pervan |
| 10,328,680 | B2 | 6/2019 | Pervan |
| 10,828,881 | B2 | 11/2020 | Bergelin |
| 11,149,441 | B2 | 10/2021 | Baert et al. |
| 11,542,712 | B2 | 1/2023 | Baert et al. |
| 11,649,641 | B2 | 5/2023 | Baert et al. |
| 12,168,877 | B2 | 12/2024 | Baert et al. |
| 2005/0208258 | A1 | 9/2005 | Hosokawa |
| 2005/0286397 | A1 | 12/2005 | Inagaki |
| 2007/0033891 | A1 | 2/2007 | Imbabi |
| 2008/0149137 | A1 | 6/2008 | Steinbrenner |
| 2008/0318004 | A1 | 12/2008 | Ruhe |
| 2009/0011279 | A1 | 1/2009 | Wisenbaker, Jr. et al. |
| 2009/0017320 | A1 | 1/2009 | Donelson |
| 2009/0155612 | A1 | 6/2009 | Pervan |
| 2009/0235607 | A1 | 9/2009 | Chen |
| 2009/0308001 | A1 | 12/2009 | Wu |
| 2010/0115974 | A1 | 5/2010 | Okaza |
| 2011/0067336 | A1 | 3/2011 | McDonald |
| 2013/0295346 | A1 | 11/2013 | Ferguson |
| 2014/0087156 | A1 | 3/2014 | Sarkis |
| 2014/0134402 | A1 | 5/2014 | Pallon |
| 2014/0272302 | A1 | 9/2014 | Ciuperca |
| 2015/0059621 | A1 | 3/2015 | Hauber |
| 2015/0174947 | A1* | 6/2015 | Bader ...................... B30B 5/06 |
| | | | 264/293 |
| 2016/0288447 | A1 | 10/2016 | Cordeiro |
| 2017/0204616 | A1 | 7/2017 | Scholz |
| 2017/0217133 | A1 | 8/2017 | Jordan et al. |
| 2018/0147873 | A1 | 5/2018 | De Mondt |
| 2018/0258651 | A1 | 9/2018 | Meersseman |
| 2018/0283014 | A1 | 10/2018 | Hodgkins et al. |
| 2019/0308914 | A1 | 10/2019 | Kong |
| 2020/0039190 | A1 | 2/2020 | Lenaerts |

FOREIGN PATENT DOCUMENTS

| | | | |
|---|---|---|---|
| CN | 201687168 U | 12/2010 | |
| CN | 207959771 U | 10/2018 | |
| CN | 110607893 | 12/2019 | |
| DE | 102012000468 | 7/2013 | |
| EP | 1126064 B1 * | 12/2003 | ............ D04H 18/04 |
| EP | 2060389 | 5/2009 | |
| EP | 2690142 | 1/2014 | |
| EP | 3536874 | 9/2019 | |
| JP | 10828015 | 1/1996 | |
| KR | 20140066086 | 5/2014 | |
| SE | 19503648 | 3/2019 | |
| WO | 2012061300 | 5/2012 | |
| WO | 2014007738 | 1/2014 | |
| WO | 2018234561 | 12/2018 | |
| WO | 2019064113 | 4/2019 | |
| WO | 2020114645 | 6/2020 | |
| WO | 2020197475 | 10/2020 | |

OTHER PUBLICATIONS

International Search Report and Written Opinion of Corresponding Application No. NL 2025119 mailed Jan. 14, 2021.
International Search Report and Written Opinion of corresponding PCT Application No. NL2025684, mailed Mar. 3, 2021.

* cited by examiner

PANEL AND METHOD OF PRODUCING A PANEL

BACKGROUND

1. Technical Field

The invention relates to a belt roller system for applying a surface structure in a floor panel or wall panel. The invention also relates to a method for applying a surface structure in a floor panel or a wall panel.

2. Description of the Related Art

The market of rigid floating floors has known a significant growth over the past years, evolving from thin flexible strips of vinyl or LVT (Luxury Vinyl Tiles) to thick, rigid engineered hybrid products integrating multiple layers that feature multiple benefits such as an unprecedented stability under temperature fluctuations, reduced chance of telegraphing or deformation on uneven subfloors and increased lock strength between panels.

This development towards more rigid floor panels, typically having a polymeric core is carried by products such as WPC (Wood Plastic Composite, in effect a foamed PVC core with or without wood particles, and a density of around 900 kg/m3) and SPC (Stone Plastic Composite, a solid PVC core with a density of around 2000 kg/m3). Compared to WPC, SPC has a superior dimensional stability when subjected to temperature fluctuations, allowing for a larger installation surface area, and installation in hot and high-traffic areas. Another advantage of solid core SPC compared to low density WPC is its resistance to impacts and indentations. A disadvantage inherent to solid core SPC however is that its acoustic performance is unsatisfactory. Its sound performance underperforms with respect to the more flexible and soft LVT and WPC.

In general, it can be said that an increase in filler or mineral content in the product, leads to a higher rigidity and an improved dimensional stability; but also to a worse acoustic performance. Acoustical performance in the flooring industry is understood as both the amplitude reduction of a sound wave when moving through the flooring (sound transmitted to room below) as well as reduction of amplitude when tested for reflected walking sound (the sound heard in the same room). The transmission sound reduction can be tested as "Delta IIC" (USA) or "Delta Lw" (Europe, Australia). These two test methods give an indication of the sound transmission reduction to the room below due to the decorative flooring, in simple terms being the difference between sound transmission with or without the decorative flooring installed. To improve (reduce) the amplitude of the transmitted sound, an underlay can be installed between the decorative flooring and the subfloor, or an acoustic pad can be adhered to the back surface of the decorative flooring in the factory. Per illustration, a 4 mm SPC with a 1 mm pre-attached EVA backing can expect to reach a Delta Lw result of 12 dB; a WPC product with the same specifications generally reaches 20 dB. The lower density of the WPC allows for an improved sound absorption.

It is known in the prior art to apply "grooves" on the back of a wood-based or thermoplastic flooring panel to improve stability and increase flexibility. These grooves are generally applied through removal of material by cutting with a saw blade or carving with a tool. It is also known to apply grooves to extruded thermoplastic flooring panels through clever shaping of the extruding mould through which the single-piece support plate is extruded, thereby forming "strip-shaped recesses" that follow the direction of extrusion. Both production methods result in linear designs of the bottom surface texture. In effect these panels feature a linear or longitudinal design where the boundaries of the cavities applied to the bottom surface of the floor panels are one-directional on the plane of the bottom surface. Although the applied grooves may have at least one boundary that defines the exit or entry point of the tool used for their application, at least 90%, often more than 95%, most often more than 98% of the entire perimeter of these linear or longitudinal cavities or grooves have boundaries that are linear and parallel to one another. These longitudinal cavity boundaries form a line between the point of entry into the panel and their point of exit. Typically, the applied grooves are defined therefore by boundaries that are dominantly facing in a single direction, equal to the direction of the cutting or extrusion process through which they were applied. When there is a plurality of these grooves present on the back surface, they are present with the dominant linear or longitudinal boundaries parallel to one another and facing in the same direction.

As a first example, a 2 mm cut groove applied across a floor board of 200 mm width running from edge to edge has boundaries that 100% run in the direction of the cutting process. As a second example, a 10 mm extruded groove applied in the length of the board running from edge to edge has boundaries that 100% run in the direction of the extrusion process. As a third example, a 2 mm cut groove that does not run from edge to edge and is applied in the length of the board, necessarily has a length that is a multiple of the entry point and length of the cutting tool, for example 300 mm, which translates in 99.4% of the boundaries running in the direction of the cutting process. A plurality of these applied grooves have boundaries running parallel to one another, forming a linear design. These linear designs suffer from an unbalanced rigidity and dimensional stability. Such panels suffer from a rigidity that is lower perpendicular to the direction of the applied grooves, than in the direction of the applied grooves, which may lead to warping when subjected to normal use or temperature fluctuations. Such panels also miss opportunities for acoustic improvement as they do not allow for more complex acoustical designs.

To enable a more complex acoustical design, textured die nip rollers can be used to imprint a repeated pattern of cavities into the surface of an extruded SPC panel. Such die nip rollers are located opposite each other, with a gap in between. As the extruded panel is transported to this gap, the die nip rollers, rotating in opposing directions, engage the panel and transport the panel between them. Typically, one or both rollers have a structured outer surface in the form of a repeated pattern. As the warm and pliable panel is fed in between the rollers, the pattern is imprinted in a surface of the panel.

For SPC panels, and floor panels in general, it is often desirable to have a smooth even top surface, while a bottom surface is structured. A complex acoustical design, such as honey comb design, can be imprinted in the bottom surface of the panel by feeding an extruded panel through a pair of die nip rollers, wherein the lower roller has a negative version of a honeycomb structure. The structure of the rotating lower roller presses into the still soft panel and the pattern is transferred from the roller to the panel.

Nevertheless, the method as outlined above for applying a surface structure in a floor panel or a wall panel, has several disadvantages. The duration of contact between the panel and the rollers is very short. As the polymeric melt is subjected to a high temperature to allow for thermoforming, the panel constituted by this polymeric melt tends to at least partly recover its shape immediately after the short term duration wherein it resides between both rollers. As a result, the applied surface structure is not maintained and formed as intended. In effect, the depth of the applied surface structure can be 10-20% less than the corresponding height of the surface structure of the roller.

In addition, when one surface structure is applied to the panel and the opposite surface is intended to be smooth, the resilience of the material of the panel transfers the tension applied by the textured roller to the opposite smooth surface. This causes stress and deformation of the smooth surface. To prevent this transmission or telegraphing of the impressed surface structure to the opposite side of the panel, the height of the surface structure of die nip rollers is not allowed to go beyond 1 mm. In addition, the diameter of protruding parts of the surface structure of die nip rollers should not exceed 1 mm.

Moreover, replacing a die nip roller takes around 8 hours due to the need to cool down the nip roller before handling. The present nip roller has to be replaced if and when production switches from textured to non-textured panels, or vice versa. As such, the industrial efficiency of die nip rollers is limited, especially when frequent changes in flooring panel production are required.

It is therefore an object of the present invention to more accurately apply a surface structure to a panel and to prevent telegraphing of that surface structure. In addition, it is an object of the present invention to decrease the time required to switch from production of textured panels to non-textured panels.

BRIEF SUMMARY

In a first aspect, the present invention provides thereto a belt roller system for applying a surface structure in a floor panel or wall panel, said system comprising: at least one upper endless belt and at least one lower endless belt, wherein each belt is rotatable around at least two pulleys, and at least one drive unit for rotating the upper endless belt and/or the lower endless belt, wherein at least part of the upper endless belt comprises a surface structure and/or wherein at least part of the lower endless belt comprises a surface structure, wherein the upper endless belt and the lower endless belt are positioned substantially parallel to each other such that a panel can be transported between the upper endless belt and the lower endless belt such that the surface structure of the upper endless belt and/or the surface structure of the lower endless belt is transferred into the panel upon transport of the panel between said upper endless belt and said lower endless belt.

The belt system according to the present invention is in particular suited for applying a surface structure to an SPC panel. Both endless belts provide a pressure over a given length of the panel. This is different from an upper and lower roller without a belt, as the rollers would only provide pressure over a very limited surface area, whereas endless belts enable the exertion of pressure over a much larger surface area. In addition, the residence time of the panel between both belts is substantially increased by the belts by the drastically increased surface area as compared to a pair of opposing rollers.

As the contact area between the panel and the endless belts is relatively large as compared to a pair of opposing rollers, the tension generated in the panel by the deformation of the panel caused by the surface structure of the endless belt, is allowed to dissipate prior to the panel exiting the space between both endless belts. Moreover, the polymeric resilient melt is allowed to at least partially cool down while being subjected to pressure. As such, the surface structure of at least one of the endless belts is not only transferred to the panel, but also maintained by the panel.

The transfer of a surface structure is defined herein as impressing a surface structure of an endless belt in the surface of a panel. Preferably, the panel is deformable such that the surface structure of the panel corresponds to a negative version of the surface structure of the endless belt.

The surface of the panel is defined herein as being an outer surface of the panel. The surface of the endless belt is defined herein as being an outer surface of the endless belt. In the latter case, the outer surface of the endless belt is the surface of the endless belt which in use contacts the panel. The inner surface of the endless belt is directed to, e.g. the pulleys where the endless belt rotates around.

Preferably, one of the upper endless belt and the lower endless belt comprises a surface structure and wherein the other comprises a substantially smooth surface. This allows the top surface of the panel to be planar and smooth, while the bottom surface of the panel has a structured outer surface. In addition, telegraphing of the bottom surface structure is reduced or eliminated.

The surface structure of the upper endless belt and/or the lower endless belt may comprise a plurality of protrusions and recessions, wherein a height difference between at least part of the protrusions and recessions may be at least 1 mm, preferably at least 1.5 mm. The longer contact time of the panel and the endless belts, as compared to a set of opposing die nip rollers, allows this large height difference between protrusions and recessions. A protrusion having a height of 1.5 mm, 2 mm, 3 mm, or larger can be impressed in a panel and causes a corresponding recession having a depth of 1.5 mm, 2 mm, 3 mm, or larger to be formed and maintained in the surface of the panel. In line with this, an average diameter of at least part of the protrusions can be at least 1 mm, preferably at least 1.5 mm. Larger protrusion diameters, such as 2 mm, 3 mm, or even larger, allow formation and maintenance of correspondingly sized recessions in the panel.

Preferably, the surface structure of the upper endless belt and/or the surface structure of the lower endless belt comprises a repeated pattern. As such, a panel can be formed having a continuously repeated pattern over the entire length of one or more outer surfaces of the panel.

Preferably, the surface structure of the upper endless belt and/or the surface structure of the lower endless belt defines a cell pattern and/or a grid pattern. This allows formation of a panel having enhanced acoustic performance, as the structure more precisely conforms to the intended structure, because the shape of the surface structure is maintained. Such a panel could also be referred to as acoustic panel.

In one embodiment, at least one of the upper endless belt and the lower endless belt are made from a material chosen from steel, stainless steel, chilled cast iron, or combinations thereof. These material are durable, and pressure resistant. These materials are resistant to high temperatures as well. As such, their surface structure is maintained, even after long term use. This results in reliable and accurate formation of a surface structure in an extruded panel, such as an SPC panel.

In another embodiment, at least part of the surface of at least one endless belt comprises a chrome surface, a plasma treated surface, a polytetrafluoroethylene surface, or combinations thereof. Advantageously, this prevents the surface of the endless belt from sticking to the surface of the panel. When the panel and the surface structure of the endless belt separate, the formed surface structure of the panel is not accidentally deformed as a result of this disengagement.

Preferably, the belt roller system comprises at least one cooling unit configured for cooling at least part of a surface of a panel via the upper endless belt and/or the lower endless belt. This cooling could be effected via tubes suitable for a cooling agent. The tubes may be located near or adjacent to an inner surface of one or both endless belts. This allows to more rapidly cool and solidify the panel and hence, the surface structure transferred thereon. As a result, the panel is better able to maintain its shape after impressing, and surface telegraphing is prevented.

In another embodiment, the length over which the upper endless belt and the lower endless belt are positioned substantially parallel to each other is at least 30 cm or at least 50 cm. Likewise, the the length over which the upper endless belt and the lower endless belt are positioned substantially parallel to each other may be in the range of 30 to 100 cm. These ranges have been found to provide an optimal balance between effective formation and maintenance of the surface structure of a panel.

In a second aspect, the present invention provides a method for applying a surface structure in a floor panel or a wall panel, wherein the panel is transported between at least one upper endless belt and at least one lower endless belt which are positioned substantially parallel, wherein at least part of the upper endless belt comprises a surface structure and/or wherein at least part of the lower endless belt comprises a surface structure, such that the surface structure of the upper endless belt and/or the surface structure of the lower endless belt is transferred into the panel upon transport of the panel between said upper endless belt and said lower endless belt. This method provides all advantages as mentioned hereinabove.

Preferably, one of the upper endless belt and the lower endless belt comprises a surface structure and wherein the other comprises a substantially smooth surface.

The surface structure of the upper endless belt and/or the lower endless belt may comprise a plurality of protrusions and recessions, wherein a height difference between at least part of the protrusions and recessions may be at least 1 mm, preferably at least 1.5 mm.

In one embodiment, the surface structure of the upper endless belt and/or the surface structure of the lower endless belt comprises a repeated pattern.

In another embodiment, the surface structure of the upper endless belt and/or the surface structure of the lower endless belt defines a cell pattern and/or a grid pattern.

At least one of the upper endless belt and the lower endless belt are made from a material chosen from steel, stainless steel, chilled cast iron, or combinations thereof, optionally wherein at least part of the surface of at least one endless belt comprises a chrome surface, a plasma treated surface, a polytetrafluoroethylene surface, or combinations thereof.

Preferably, at least part of a surface of the panel is cooled via the upper endless belt and/or the lower endless belt.

The length over which the panel is transported between the upper endless belt and the lower endless belt may be at least 30 cm or at least 50 cm. Likewise the length over which the panel is transported between the upper endless belt and the lower endless belt may be in the range of 30 to 100 cm.

BRIEF DESCRIPTION OF THE DRAWINGS

The invention will now be elucidated into more detail with reference to the following non-limitative figures. Herein show:

FIGS. 6a-6i are cross sectional views of various possible embodiments of cavities in panels obtainable by the method according to the present invention. Within these figures, similar references correspond to similar or equivalent components and/or technical features.

DETAILED DESCRIPTION

Figure 1:
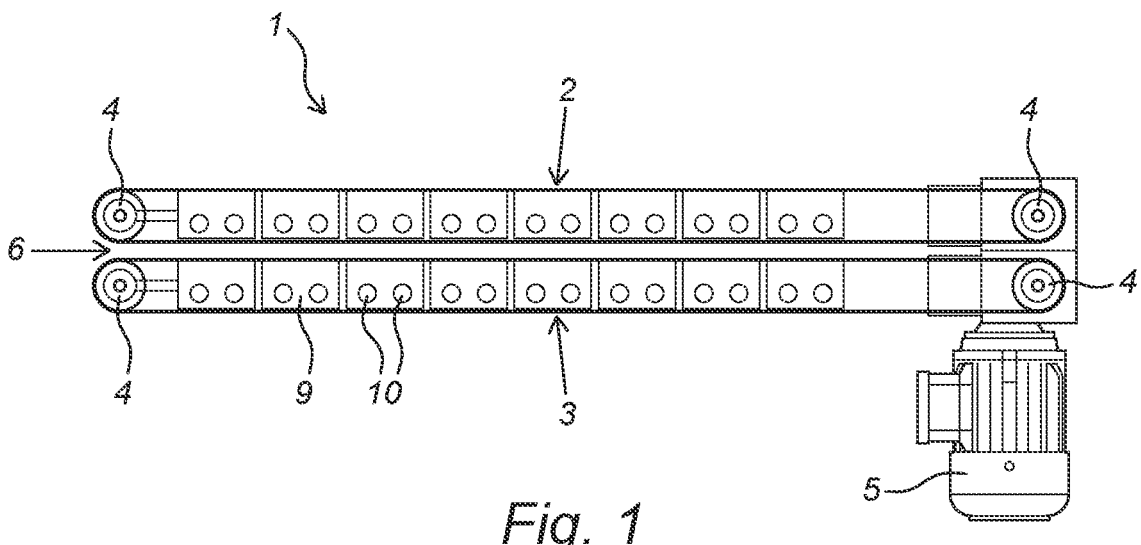
FIG. 1 is a side view of a belt roller system according to the present invention.

FIG. 1 shows a side view of a belt roller system 1 according to the present invention. The belt roller system 1 comprises an upper endless belt 2 and a lower endless belt 3. Both belts are rotatable around at least two pulleys 4. The at least two pulleys are driven by a drive unit 5. In operation, the drive unit 5 rotates the pulleys 4. A pliable extruded panel (not shown) is directed to an opening 6 between the upper endless belt 2 and the lower endless belt 3. By counter clockwise rotation of the upper endless belt 2 and clockwise rotation of the lower endless belt 3 around the pulleys 4, the panel is fed through the opening and advances through the belt roller system 1 between the endless belts 2,3.

Figure 2A:
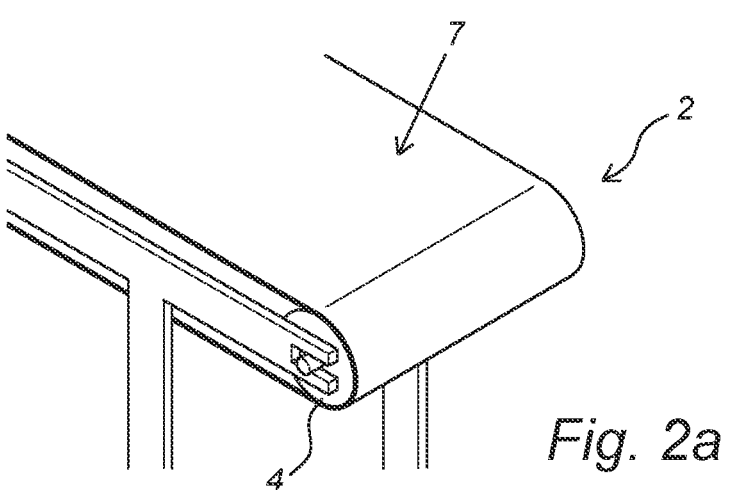
FIG. 2a is a cutaway perspective view of an endless belt according to the present invention.
Figure 2B:
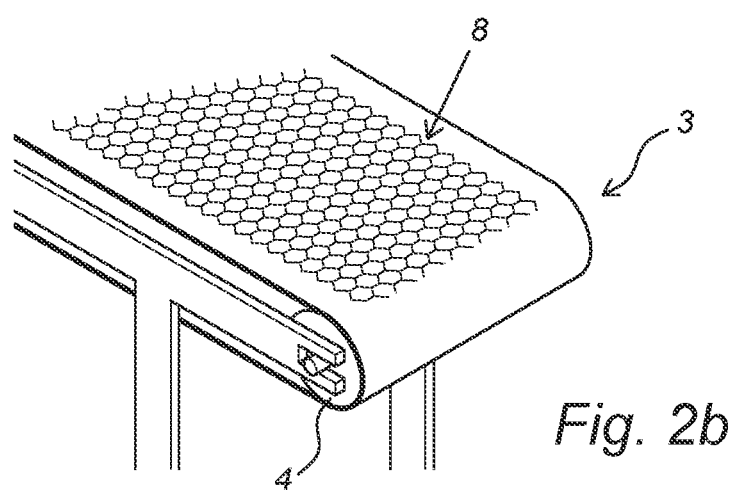
FIG. 2b is a cutaway perspective view of another endless belt according to the present invention.

FIG. 2a shows a cutaway section of the upper endless belt 2 of the belt roller system 1. The surface 7 of the upper endless belt 2 is smooth. FIG. 2b shows a cutaway section of the lower endless belt 3 of the belt roller system 1. The outer surface of lower endless belt 3 comprises a surface structure 8. The surface structure 8 has a hexagonal or honeycomb repeating pattern. The hexagonal shapes protrude from the surface of the lower endless belt 3, while the structure in between the hexagonal shapes is recessed in comparison to the hexagonal shapes.

Referring now to FIG. 1, an extruded panel, such as an SPC panel, enters the opening 6 and advances through the belt roller system 1. The structured surface 8 of the lower endless belt 3 imprints a negative of the honeycomb pattern in the bottom surface of the panel. At the same time, the smooth upper surface 7 of the upper endless belt 2 ensures that the upper surface of the panel remains smooth while a pattern is being imprinted in the bottom side of the panel.

As the panel progresses through the opening 6 between both belts 2,3, the structured surface 8 of the lower endless belt 3 remains in contact with the bottom side of the panel. As it takes some time for the panel to pass through the belt roller system 1, tension in the panel is allowed to dissipate while both belts 2,3 engage opposite surfaces of the panel. The panel enters the opening 6 between both rollers at an initial temperature. By the time the panel exits the belt roller system 1, the panel has cooled to a temperature below the initial temperature. As such, the panel has solidified somewhat. As a result of dissipating tension within the panel, and lowering of the temperature of the panel, the panel does not, or to a smaller extend tends to return to its shape prior to imprinting of the pattern, in comparison to a two roller system. A panel produced via a two roller system has cavities with a depth that is 80-90% of the height of the corresponding protrusion present on the roller. The belt roller system 1 enables to increase this dept to above 90% of the height of the corresponding protrusion present on the belt 3. Depths of 95% up to about 100% are attainable with the belt roller system 1.

To ensure that the structure provided on the panel is as close to a negative of the structure 8 provided on the lower endless belt 3, at least one cooling plate 9 are provided in one or both spaces delimited by the pulleys 4 and the belts 2,3, The at least one cooling plate 9 comprises at least one tube 10 wherein a cooling agent is allowed to circulate. Advantageously, the at least one cooling plate 9 cools down the panel while a structure is provided to the panel. Telegraphing of the structured surface of the panel is also prevented or at least reduced by the belt roller system 1. The at least one cooling plate 9 further decreases telegraphing.

Figure 3:
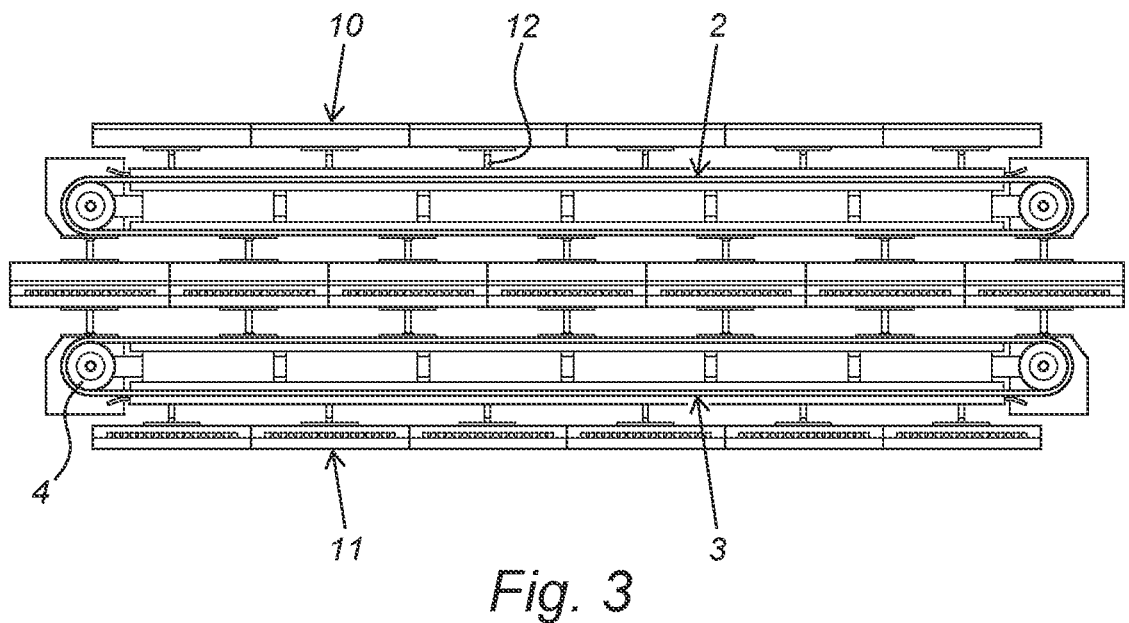
FIG. 3 is a side view of another belt roller system according to the present invention.

FIG. 3 shows another embodiment of the belt roller system 1 according to the present invention. In this system 1, plates 10,11 are provided on the endless belts 2,3. The plates are connected to the endless belts 2,3 via intercon- nects 12. Advantageously, this allows individual plates to be replaced when worn. In this belt roller system 1, plates 11 having a surface structure are carried by the lower endless belt 3 via interconnects. The upper endless belt 2 carries plates 10 having a smooth surface structure. In operation the upper endless belt 2 rotates clockwise, while the lower endless belt 3 rotates counter clockwise. An extruded poly- mer melt (not shown) is caught between opposing plates, and the surface structure of the plate 11 is transferred on the melt evenly, shaping the melt into a panel having a bottom surface structure.

Figure 4A:
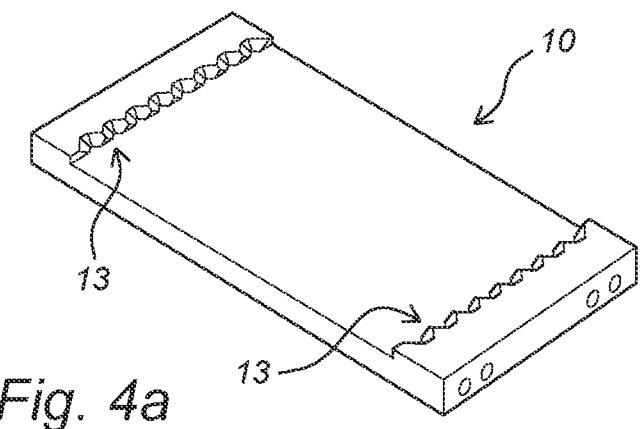
FIG. 4a is a perspective view of a plate for the belt roller system of FIG. 3.
Figure 4B:
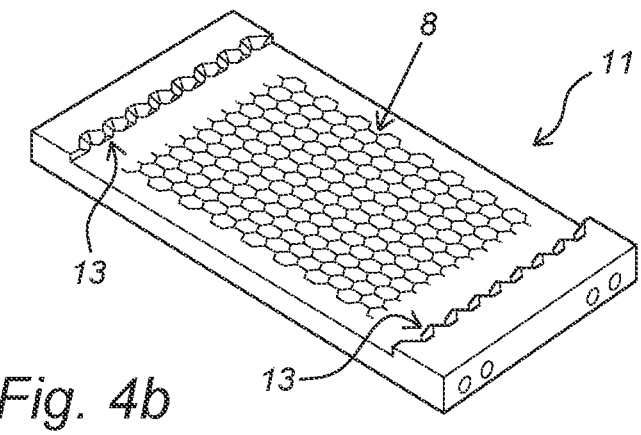
FIG. 4b is a perspective view of another plate for the belt roller system of FIG. 3.

FIGS. 4a and 4b show a plate 10 with a smooth surface and a plate 11 with a structured surface 8. The plates 10,11 have edges 13 that prevent the pliable panel material from being pushed outward, towards the sides of the plate 10, 11, in a direction perpendicular to a direction of movement of the panel through the belt roller system 1. This ensures that the thickness of the panel remains uniform throughout the structure application process.

Figure 5A:
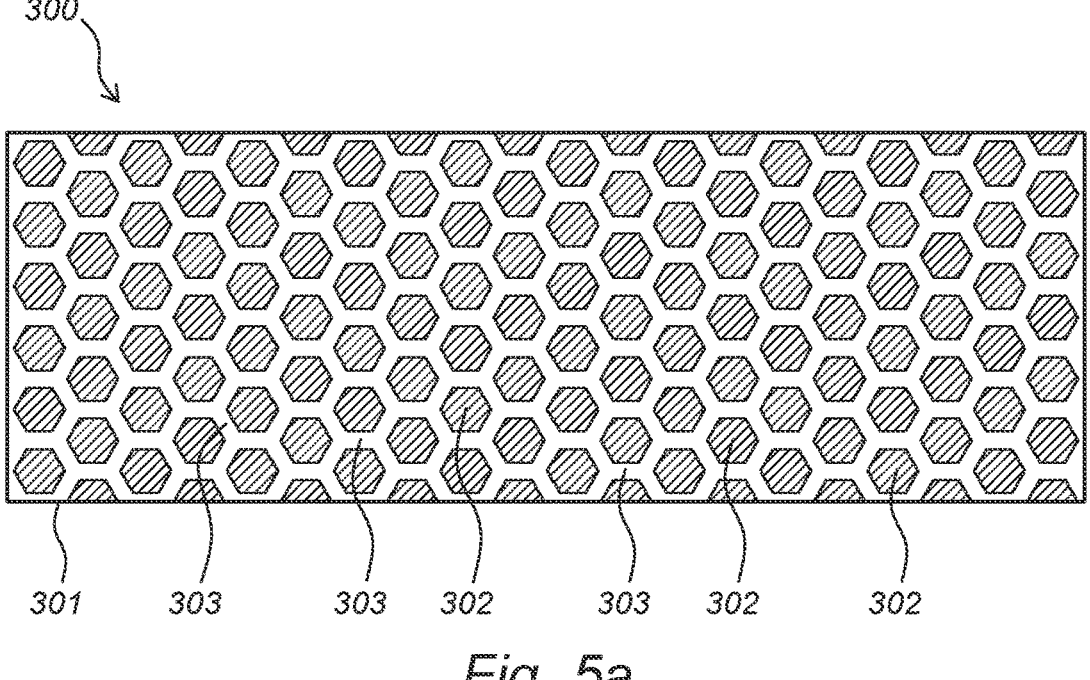
FIG. 5a is a bottom view of a possible embodiment of a panel obtainable by the method according to the present invention.

FIG. 5a shows a schematic representation of a possible embodiment of a panel 300 obtainable according to the method of the present invention. The figure shows a bottom view of a panel 300. The panel comprises a core layer 301, preferably comprising a composite material comprising a mixture of mineral material and thermoplastic material. The core layer 301 has a top surface (not shown) and a bottom surface which is shown in the picture. Part of the bottom surface of the core layer 301 is provided with a plurality of cavities 302. The cavities 302 extend towards the top surface of the core layer 301. The cavities 302 are integrally formed cavities 302. In the shown embodiment, the cavities 302 define a cell pattern, in particular a polygonal cell pattern. The figure show that the cavities 302 are separated via partitions 303, wherein at least part of the partitions 303 between the cavities 302 have a thickness which is smaller than the length and/or width of the cavities 302. In the shown embodiment, the cavities 302 are imprinted into the bottom surface of the core layer 301. Hence, the cavities 302 are imprinted cavities 302.

Figure 5B:
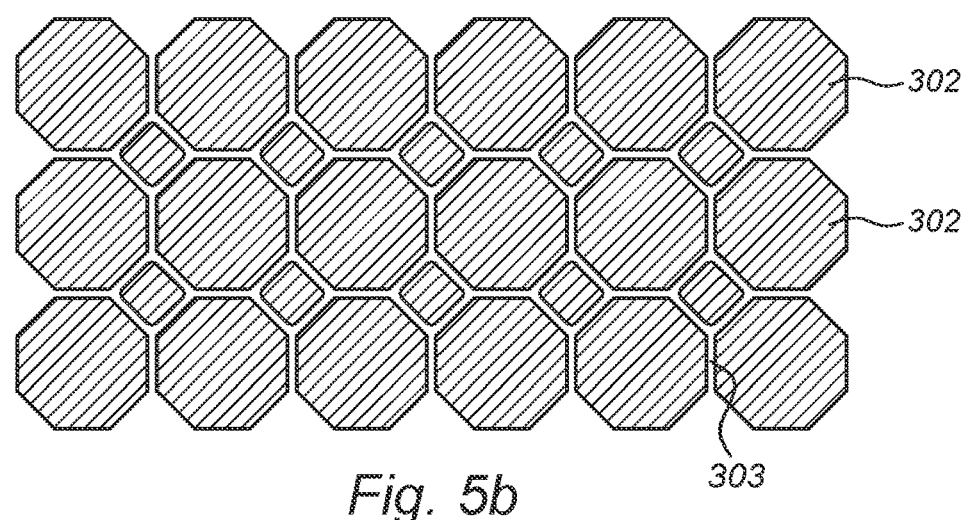
FIGS. 5b-5c are bottom views of various possible embodiments of panels obtainable by the method according to the present invention.
Figure 5C:
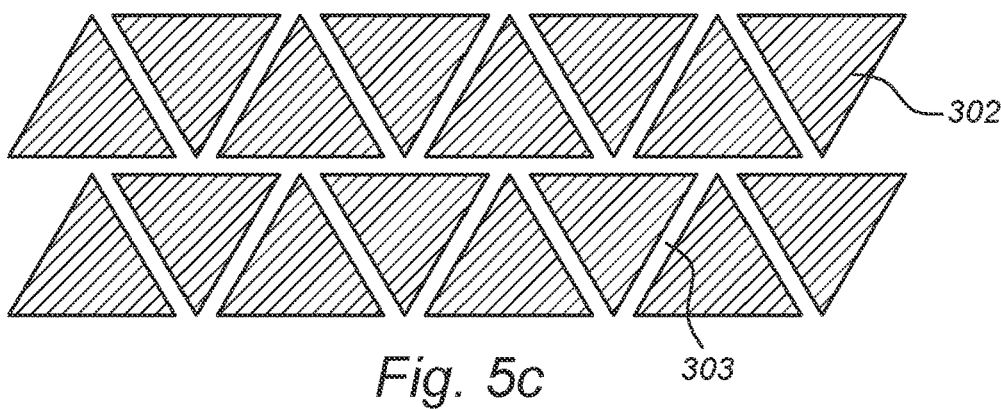
Figure 6I:
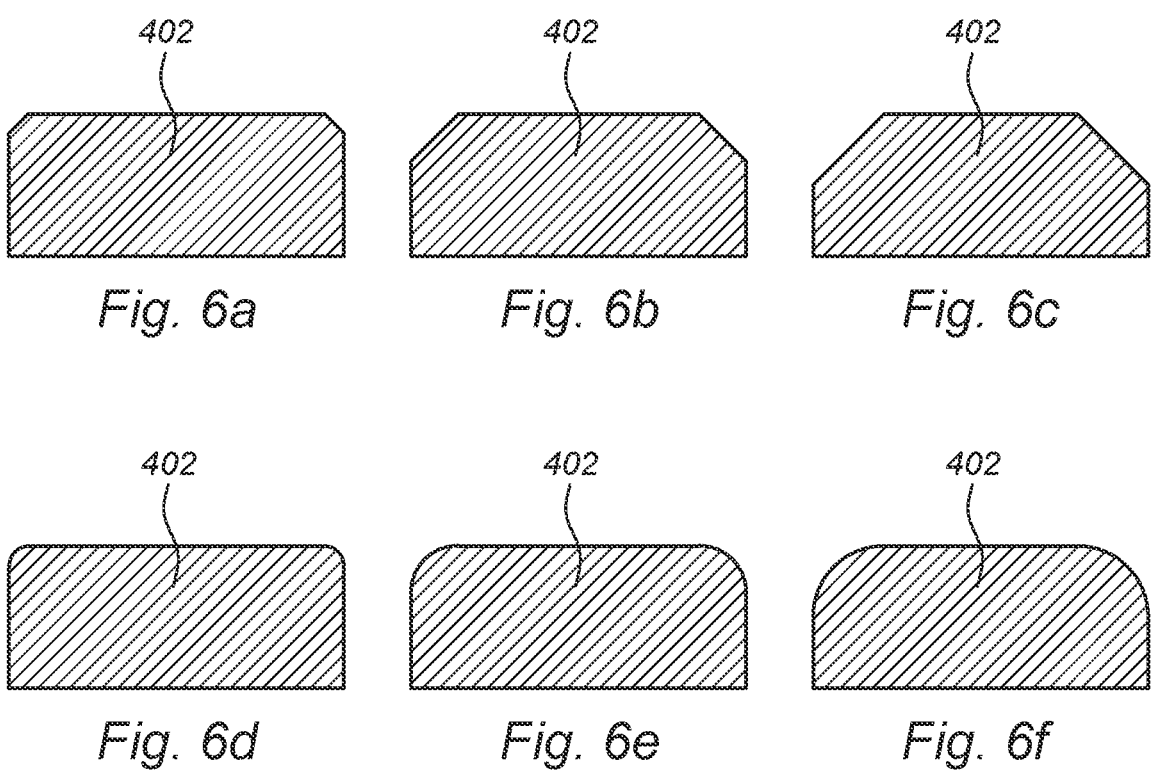
Figure 6I:
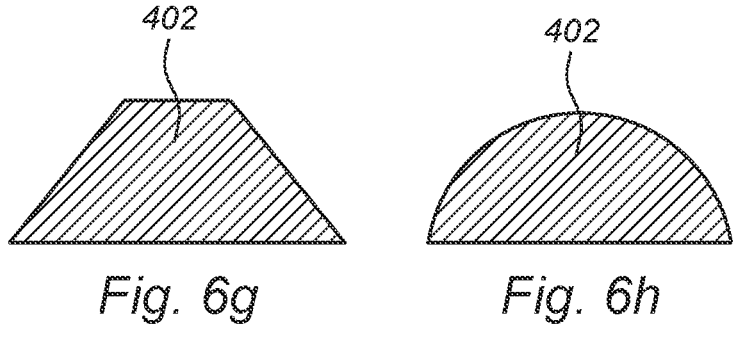
Figure 6I:
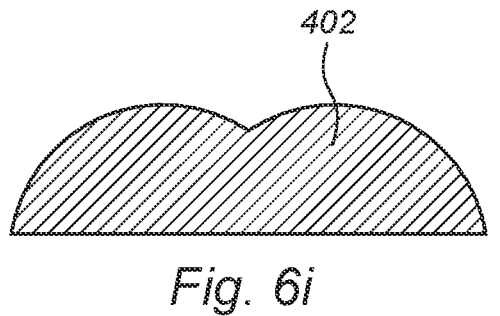

FIGS. 5b-5c show a bottom view of various further possible embodiments of a panel according to the present invention. The figures are in line with FIG. 3a, and show a bottom view of part of a panel according to the present invention. The figures show for each embodiment a plurality of impressed cavities 302, in particular in a repeated pattern. The cavities 302 are separated via partitions 303, wherein at least part of the partitions 303 between the cavities 302 have a thickness which is smaller than the length and/or width of the cavities 302.

FIGS. 6a-6i show cross sectional views of various pos- sible embodiments of impressed cavities 402 of a panel obtainable by the method according to the present invention. It can be seen that the cavities 402 have rather clear boundaries, wherefore the cavities 402 could also function as attenuation chambers. The belt roller system 1 allows the cavities 402 to be form with a higher precision. This in turn enables acoustic designs to function optimally, as the cavi- ties 402 are impressed in the panel as intended, and do not deform after impressing.

It will be apparent that the invention is not limited to the working examples shown and described herein, but that numerous variants are possible within the scope of the attached claims that will be obvious to a person skilled in the art.

The above-described inventive concepts are illustrated by several illustrative embodiments. It is conceivable that indi- vidual inventive concepts may be applied without, in so doing, also applying other details of the described example. It is not necessary to elaborate on examples of all conceiv- able combinations of the above-described inventive con- cepts, as a person skilled in the art will understand numerous inventive concepts can be (re)combined in order to arrive at a specific application.

The verb "comprise" and conjugations thereof used in this patent publication are understood to mean not only "com- prise", but are also understood to mean the phrases "con- tain", "substantially consist of", "formed by" and conjuga- tions thereof. When it is referred to reinforcing layer also a reinforcing element can be meant, or vice versa. Within the scope of this invention, where the term 'impressed cavity' is used, also the term 'cavity' could be applied, or vice versa.

What is claimed is:

1. A belt roller system for applying a surface structure in a floor panel or wall panel, said system comprising:

at least one upper endless belt and at least one lower endless belt, wherein each belt is rotatable around at least two pulleys, at least one drive unit for rotating the upper endless belt and/or the lower endless belt, wherein at least part of the upper endless belt comprises a surface structure and/or wherein at least part of the lower endless belt comprises a surface structure, wherein the upper endless belt and the lower endless belt are positioned substantially parallel to each other such that a panel can be transported between the upper endless belt and the lower endless belt such that the surface structure of the upper endless belt and/or the surface structure of the lower endless belt is transferred into the panel upon transport of the panel between said upper endless belt and said lower endless belt, and at least one cooling unit configured for cooling at least part of a surface of the panel via the upper endless belt and/or lower endless belt, while the panel is between said upper endless belt and said lower endless belt, wherein the surface structure of the upper endless belt and/or the lower endless belt comprises a plurality of protrusions and recessions, wherein a height difference between at least part of the protrusions and recessions is at least 1 mm, and wherein a length over which the upper endless belt and the lower endless belt are positioned substantially parallel to each other is at least 30 cm or at least 50 cm.

2. The belt roller system according to claim 1, wherein one of the upper endless belt and the lower endless belt comprises a surface structure and wherein the other comprises a substantially smooth surface.

3. The belt roller system according to claim 1, wherein an average diameter of at least part of the protrusions is at least 1 mm.

4. The belt roller system according to claim 1, wherein the surface structure of the upper endless belt and/or the surface structure of the lower endless belt comprises a repeated pattern.

5. The belt roller system according to claim 1, wherein the surface structure of the upper endless belt and/or the surface structure of the lower endless belt defines a cell pattern and/or a grid pattern.

6. The belt roller system according to claim 1, wherein at least one of the upper endless belt and the lower endless belt are made from a material chosen from steel, stainless steel, chilled cast iron, or combinations thereof.

7. The belt roller system according to claim 5, wherein at least part of the surface of at least one endless belt comprises a chrome surface, a plasma treated surface and/or a poly-tetrafluoroethylene surface, or a combination thereof.

8. The belt roller system according to claim 1, wherein the length over which the upper endless belt and the lower endless belt are positioned substantially parallel to each other is in the range of 30 to 100 cm.

9. The belt roller system according to claim 1, wherein:
  the panel first enters an opening between the upper endless belt and the lower endless belt at an initial temperature; and
  the at least one cooling unit is configured to cool the panel to a temperature below the initial temperature, while the panel is between the upper endless belt and the lower endless belt.

* * * * *